US008842417B2

(12) United States Patent
Gadkaree et al.

(10) Patent No.: US 8,842,417 B2
(45) Date of Patent: Sep. 23, 2014

(54) HIGH VOLTAGE ELECTRO-CHEMICAL DOUBLE LAYER CAPACITOR

(75) Inventors: Kishor Purushottam Gadkaree, Painted Post, NY (US); Shrisudersan Jayaraman, Painted Post, NY (US)

(73) Assignee: Corning Incorporated, Corning, NY (US)

(*) Notice: Subject to any disclaimer, the term of this patent is extended or adjusted under 35 U.S.C. 154(b) by 327 days.

(21) Appl. No.: 13/242,284

(22) Filed: Sep. 23, 2011

(65) Prior Publication Data

US 2013/0077206 A1 Mar. 28, 2013

(51) Int. Cl.

*H01G 9/00* (2006.01)
*H01G 9/04* (2006.01)
*H01G 11/24* (2013.01)
*H01G 11/32* (2013.01)

(52) U.S. Cl.

CPC ............. *H01G 9/058* (2013.01); *Y02T 10/7022* (2013.01); *H01G 11/24* (2013.01); *Y02E 60/13* (2013.01); *H01G 11/32* (2013.01)
USPC ........................... 361/502; 361/503; 29/25.03

(58) Field of Classification Search

USPC .................................................. 361/502–503
See application file for complete search history.

(56) References Cited

U.S. PATENT DOCUMENTS 5,639,577 A 6/1997 Takeuchi et al. .............. 429/219
5,948,329 A 9/1999 Ohsaki et al. ................ 264/29.4
6,013,208 A 1/2000 Nakamura et al. ........... 264/29.4
6,475,461 B1 11/2002 Ohsaki et al.
6,692,871 B2 2/2004 Gan et al. ................... 429/218.1
7,018,743 B2 3/2006 Guidi et al. ................... 429/233
7,091,156 B2 8/2006 Hirahara et al. .............. 502/416
7,531,274 B1 5/2009 Roy et al. ...................... 429/233
7,651,647 B1 1/2010 Strange et al. ............... 264/104
2002/0036883 A1 3/2002 Noguchi et al. .............. 361/502
2002/0048144 A1 4/2002 Sugo et al. .................... 361/502
2005/0173244 A1* 8/2005 Hayashi et al. ............... 204/282
2009/0097188 A1 4/2009 Mitchell ....................... 361/502
2012/0276448 A1* 11/2012 Yamauchi et al. ............ 429/211

FOREIGN PATENT DOCUMENTS

EP 0763509 A1 3/1996
EP 0891943 A1 11/1997
JP 5-101980 4/1993

(Continued)

OTHER PUBLICATIONS

PCT/US2012/055059 Search Report.

(Continued)

*Primary Examiner* — Eric Thomas
(74) *Attorney, Agent, or Firm* — Michael W Russell

(57) ABSTRACT

An electro-chemical double layer capacitor comprises positive and negative electrodes, where the carbon material that is incorporated into the positive electrode is halogenated carbon material, while the carbon material that is incorporated into the negative electrode is un-halogenated carbon material. Further, the carbon material incorporated into each respective electrode can have a distinct pore size distribution. A pore volume ratio of the carbon material incorporated into the positive electrode is greater than a pore volume ratio of the carbon material incorporated into the negative electrode. The pore volume ratio R is defined as R=V1/V, where V1 is a total volume of pores having a pore size of less than 1 nm, and V is a total volume of pores having a pore size greater than 1 nm.

19 Claims, 7 Drawing Sheets

(56) References Cited

FOREIGN PATENT DOCUMENTS

| | | | |
|---|---|---|---|
| JP | 7-201674 | | 8/1995 |
| JP | 10-116755 | | 5/1998 |
| JP | 2004-67498 | | 3/2000 |
| JP | 2004-47613 | | 2/2004 |
| JP | 2007-302512 | | 11/2007 |
| WO | 0239468 | | 5/2002 |
| WO | 2005007566 | | 1/2005 |
| WO | WO 2011065307 | A1 * | 6/2011 |

OTHER PUBLICATIONS

Yue, et al "Preparation of fibrous porous materials by chemical activation 1. $Zncl_2$ activation of polymer-coated fibers", Carbon 40 (2002) 1181-1191.

Teng, et al "Peparation of porous carbons from phenol-formaldehyde resins with chemical and physical activation", Carbon 38 (2000) 817-824.

Pandolfo, et al "Carbon properties and their role in supercapacitors", Journal of Power Sources, 157 (2006) 11-27.

Ahmadpour, et al "The Preparation of Active Carbons From Coal by Chemial and Physical Activation" Carbon, vol. 34, No. 4, pp. 471-479 1996.

Ahmadpour, et al "The Preparation of Activated Carbon From Macadamia Nutshell by Chemical Activation", Carbon vol. 35, No. 12, pp. 1723-1732 1997.

Tennison, et al "Phenolic-resin-derived activated carbons", Applied Catalysis A: General 1973 (1998) 289-311.

Lee, et al "The adsorption properties of surface modified activated carbon fibers for hydrogen storages" Catalysis Today 120 (2007) 420-425.

Nanse, et al "Fluorination of carbon blacks. An X-Ray photoelectron spectroscopy study. Part II XPS study of a furnace carbon black . . . " Carbon vol. 35, pp. 371-388 1997.

Endo, et al., "Capacitance and Pore-Size Distribution in Aqueous and Nonaqueous Electroloytes Using Various Activiated Carbon Electrodes", Journal of The Electrochemical Society, 148(8), A910-A914, (2001).

Illan-Gomez, M.J.; Garcia-Garcia, A.; de Lecea, C.S.-M., and Linares-Solano, A., Activated Carbons from Spanish Coals. 2. Chemical Activation. Energy & Fuels 1996, 10, 1108-14.

Kadlec, O.; Varhanikova, A.; Zukal, A., Structure of Pores of Active Carbons Prepared by Water-Vapour and Zinc-Dichloride Activation. Carbon 1970, 8, 321-331.

Treusch, O.; Hofenauer, A.; Troger, F.; Fromm, J.; Wegener, G., Basic Properties of Specific Wood-based Materials Carbonised in a Nitrogen Atmosphere. Wood Sci Technol (2004) 38: 323-333.

Boehm, H.P., Some Aspects of the Surface Chemistry of Carbon Blacks and Other Carbons. Carbon 1994, 32, (5), 759-769.

Cadek, M.; Oettinger, O.; Wachtler, J.; Raymundo-Pinero, E.; Beguin, F., Bio-Based Materials for Supercapacitor. Carbon 2007.

Raymundo-Pinero, E.; Cadek, M; Beguin, F., Tuning Carbon Materials for Supercapacitors by Direct Pyrolysis of Seaweeds. Advanced Functional Materials 2009, 19, 1032-1039.

* cited by examiner

HIGH VOLTAGE ELECTRO-CHEMICAL DOUBLE LAYER CAPACITOR

BACKGROUND

The present disclosure relates generally to activated carbon materials and more particularly to electro-chemical double layer capacitors comprising passivated activated carbon-based electrodes.

Energy storage devices such as ultracapacitors may be used in a variety of applications such as where a discrete power pulse is required. Example applications range from cell phones to hybrid vehicles. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into high energy density devices are known. The carbon materials, which form the basis of the electrodes, can be made from natural or synthetic precursor materials. Natural precursor materials include coals, nut shells, and biomass. Synthetic precursor materials typically include phenolic resins. With both natural and synthetic precursors, carbon materials can be formed by carbonizing the precursor and then activating the resulting carbon. The activation can comprise physical (e.g., steam) or chemical activation.

A property of the carbon that can influence its performance when incorporated into high energy density devices such as electro-chemical double layer capacitors (EDLCs) is the specific capacitance. Higher specific capacitance generally results in a higher volumetric energy density of the resulting device. In relation to the capacitance, a beneficial attribute is the ability to maintain (or not significantly lose) capacitance over time and/or as a result of multiple charge-discharge cycles that accumulate with use. Aging of the carbon materials, such as by radical or ion trapping, can reduce the useful life of ultracapacitors comprising activated carbon-based electrodes.

In addition to increasing the capacitance, because energy density is also proportional to the operating voltage of the device, higher energy densities can be achieved by operating the EDLC at higher voltages. The applied voltage can be limited, however, by physical and chemical interactions that occur at the surfaces of the carbon material. These interactions, which include Faradaic reactions that are deleterious to the functionality of the carbon, are exacerbated at higher voltages. Current state of the art EDLCs operate at about 2.7 Volts.

Accordingly, it would be an advantage to provide activated carbon materials having a high specific capacitance that are resistant to aging and which can be incorporated into EDLCs for operation at higher voltages, such as about 3 Volts. Such materials can be used to form carbon-based electrodes that enable efficient, long-life and high energy density devices.

SUMMARY

According to one embodiment, an electro-chemical double layer capacitor comprises a positive electrode comprising a halogenated first carbon material and a negative electrode comprising an un-halogenated second carbon material. The carbon materials can include activated carbon. According to a further embodiment, the halogenated carbon material incorporated into the positive electrode has a pore volume ratio that is greater than a pore volume ratio of the un-halogenated carbon material incorporated into the negative electrode. The pore volume ratio R of activated carbon is defined as $R=V1/V$, where V1 is a total volume of pores having a pore size of less than 1 nm, and V is a total volume of pores having a pore size greater than 1 nm, e.g., between 1 and 2 nm, between 1 and 5 nm, or between 1 and 10 nm.

By providing an asymmetric distribution of pore size and/or pore size distribution in the respective positive and negative electrodes, the electrode materials can be tailored for more efficient interaction with particular ions (anions and cations) and radicals within the electrolyte. Further, by providing halogenated carbon in the positive electrode, the carbon material is passivated with respect to halogen-containing ions such as $BF_4^-$ anions that may otherwise react with the carbon or with surface species present on the carbon.

Additional features and advantages will be set forth in the detailed description which follows, and in part will be readily apparent to those skilled in the art from that description or recognized by practicing the invention as described herein, including the detailed description and the claims.

It is to be understood that both the foregoing general description and the following detailed description present embodiments of the disclosure, and are intended to provide an overview or framework for understanding the invention as it is claimed.

The accompanying drawings are included to provide a further understanding of the disclosure, and are incorporated into and constitute a part of this specification.

DETAILED DESCRIPTION

Figure 1:
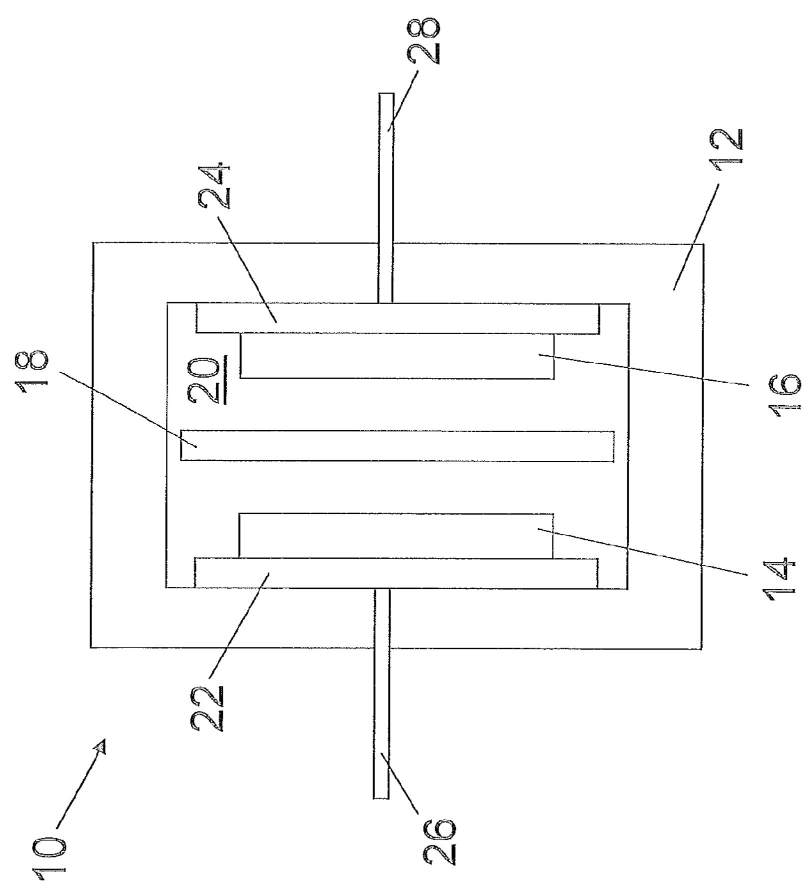
FIG. 1 is a schematic cross-section of a portion of an example electro-chemical double layer capacitor.

An ultracapacitor, also known as a double-layer capacitor, polarizes an electrolytic solution to store energy electrostatically. Though it is an electrochemical device, no chemical reactions are involved in the energy storage mechanism. The mechanism is reversible, which allows the ultracapacitor to be charged and discharged many times.

Ultracapacitors typically comprise two porous electrodes that are isolated from electrical contact with each other by a porous dielectric separator. The separator and the electrodes are impregnated with an electrolytic solution, which allows ionic current to flow between the electrodes while preventing electronic current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrode to generate an electrode potential.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The performance of electro-chemical double layer capacitors (EDLCs) comprising carbon-based electrodes can be intimately related to the properties of the carbon. Specifically, the total available porosity and pore size distribution can impact EDLC performance. It has been commonly thought that significant quantities of mesopores are needed for electrolyte ion access to the interior surfaces of the carbon material. In this disclosure, it is demonstrated that EDLCs comprising activated carbon that is tailored to the size of the respective positive and negative ions in the electrolyte exhibit a high specific capacitance (or energy density) and superior resistance to capacitive aging than EDLCs using homogeneous carbon-based electrodes. This advantage is attributable to the customized pore size distribution of the carbon materials.

It also demonstrated that by halogenating the carbon material that is incorporated into the positive electrode, Faradaic reactions with halogen atom-containing ions such as $BF_4^-$ ions that would otherwise react with the carbon or with surface-terminating species on the carbon can be avoided. The halogenation effectively passivates the carbon material and minimizes the reactivity of the carbon toward other halogen-containing species.

FIG. 1 is a schematic illustration of an example ultracapacitor 10, which includes the tailored electrode architecture disclosed herein. Ultracapacitor 10 includes an enclosing body 12, a pair of current collectors 22, 24, a positive electrode 14 and a negative electrode 16 each formed over one of the current collectors, and a porous separator layer 18. Electrical leads 26, 28 can be connected to respective current collectors 22, 24 to provide electrical contact to an external device. Electrodes 14, 16 comprise porous activated carbon layers that are formed over the current collectors. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage. Ultracapacitors can have a jelly roll design, prismatic design, honeycomb design, or other suitable configuration.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the carbon-based electrodes 14, 16 from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/011,066, the disclosure of which is incorporated herein by reference. An example quaternary ammonium salt is tetraethylammonium tetrafluoroborate ($(Et)_4NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydrofuran, 2-methyl-tetrahydro furan, 1,3-dioxolan, 1,2-dioxolan, 2-methyldioxolane and 4-methyl-dioxolan. A combination of two or more solvents may also be used.

In various embodiments, the activated carbon used to form the carbon-based electrodes can be derived from a variety of different carbon precursor materials. Example carbon precursor materials and associated methods of forming activated carbon are disclosed in commonly-owned U.S. patent application Ser. Nos. 12/335,044, 12/335,078, 12/788,478 and 12/970,073, the entire contents of which are hereby incorporated by reference.

As an overview to an example method, a carbon precursor material can be heated at a temperature effective to first carbonize the precursor material. Example carbonization temperatures are greater than about 450° C. (e.g., at least 450, 500, 550, 600, 650, 700, 750, 800, 850 or 900° C.). An inert or reducing atmosphere can be used during carbonization of the carbon precursor. Example gases and gas mixtures include one or more of hydrogen, nitrogen, ammonia, helium and argon. The carbonized material can be activated.

Physical or chemical activation processes may be used to produce activated carbon. In a physical activation process, raw material or carbonized material is exposed to typically oxidizing conditions (carbon monoxide, oxygen or steam) at elevated temperatures (e.g., greater than 250° C.). Chemical activation on the other hand involves impregnating raw or carbonized material with an activating agent, and then heating the impregnated carbon to a temperature typically in the range of 400-900° C. Chemical activating agents include alkali hydroxides or chlorides (e.g., NaOH, KOH, NaCl, KCl), phosphoric acid, or other suitable salts such as $CaCl_2$ or $ZnCl_2$.

Following chemical activation, the activated carbon can be washed to remove inorganic compounds and any chemical species derived from reactions involving the activating agent. Whether produced by steam or by chemical activation, the activated carbon can be dried and optionally ground.

The performance (energy and power density) of an ultracapacitor depends largely on the properties of the activated carbon that makes up the electrodes. The activated carbon materials disclosed herein can be used to form carbon-based electrodes for economically viable, high power, high energy density devices. The properties of the activated carbon, in turn, can be gauged by evaluating the surface area, porosity and pore size distribution of the material, as well as by evaluating the electrical properties of a resulting ultracapacitor. Relevant electrical properties include the area-specific resistance, and the specific capacitance.

In embodiments, the activated carbon can be characterized by a high surface area. A carbon-based electrode for an EDLC can include carbon having a specific surface area greater than about 300 $m^2/g$, i.e., greater than 300, 350, 400, 500 or 1000 $m^2/g$. Further, the activated carbon can have a specific surface area less than 2500 $m^2/g$, i.e., less than 2500, 2000, 1500, 1200 or 1000 $m^2/g$.

The activated carbon can comprise micro-, meso- and/or macroscale porosity. As defined herein, microscale pores have a pore size of 2 nm or less and ultra-microscale pores have a pore size of 1 nm or less. Mesoscale pores have a pore size ranging from 2 to 50 nm. Macroscale pores have a pore size greater than 50 nm. In an embodiment, the activated carbon comprises a majority of microscale pores. As used herein, the term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.4 $cm^3/g$ (e.g., greater than 0.4, 0.45, 0.5, 0.55, 0.6, 0.65 or 0.7 $cm^3/g$). The portion of the total pore volume resulting from micropores ($d \leq 2$ nm) can be about 90% or greater (e.g., at least 90, 94, 94, 96, 98 or 99%) and the portion of the total pore volume resulting from micropores ($d \leq 1$ nm) can be about 50% or greater (e.g., at least 50, 55, 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.2 $cm^3/g$ or more (e.g., 0.2, 0.25, 0.3, 0.35 or 0.4 $cm^3/g$ or more) of the total pore volume. Pores having a pore size (d) in the range of $1<d \leq 2$ nm can comprise 0.05 $cm^3/g$ or more (e.g., at least 0.1, 0.15, 0.2 or 0.25 $cm^3/g$) of the total pore volume. If present, any pores having a pore size greater than 2 nm, which may include mesopores and/or macropores, can comprise 0.15 $cm^3/g$ or less (e.g., less than 0.1 or 0.05 $cm^3/g$) of the total pore volume.

Once formed, the activated carbon can be incorporated into a carbon-based electrode. In a typical electro-chemical double layer capacitor (EDLC), a pair of carbon-based electrodes is separated by a porous separator and the electrode/separator/electrode stack is infiltrated with a liquid organic or inorganic electrolyte. The electrodes may comprise activated carbon that has been mixed with other additives (e.g., binders) and compacted into a thin sheet and laminated to a conductive metal current collector backing.

One method for producing a carbon-based electrode comprises heating a suitable carbon precursor in an inert or reducing atmosphere to form a first carbon material, mixing the first carbon material with an inorganic compound to form an aqueous mixture, heating the aqueous mixture in an inert or reducing atmosphere to incorporate the inorganic compound into the first carbon material, removing the inorganic compound from the first carbon material to produce an activated carbon material, optionally heating the activated carbon in an inert or reducing atmosphere to decrease the oxygen content in the activated carbon, optionally exposing the activated carbon to a halogen source to incorporate halogen atoms into the carbon, and forming a carbon-based electrode from the activated carbon.

By way of example, a carbon paper having a thickness in the range of about 100-300 micrometers can be prepared by rolling and pressing a powder mixture comprising 60-90 wt. % activated carbon, 5-20 wt. % carbon black and 5-20 wt. % PTFE. Carbon sheets can be stamped or otherwise patterned from the carbon paper and laminated to a conductive current collector to form a carbon-based electrode. The carbon-based electrode can be incorporated into an energy storage device. During use, an electro-chemical double layer can form via the stored charge that accumulates on opposing electrodes. The amount of charge stored in the double layer impacts the achievable energy density and power density of the capacitor.

According to an embodiment, an electrochemical cell comprises a first electrode comprising a first activated carbon material, a second electrode comprising a second activated carbon material, a porous separator, and a pair of electrically conductive current collectors, wherein the porous separator is disposed between the first electrode and the second electrode, and the first and second electrodes are each in electrical contact with a respective current collector.

The electrolyte typically comprises an ionic salt dissolved in a solvent and is adapted to permeate the porous electrodes and the porous separator. It will be appreciated that with ionic salts such as tetraethylammonium tetrafluoroborate, the tetraethylammonium cation is larger than the tetrafluoroborate anion. Without wishing to be bound by theory, the size of the $(Et)_4N^+$ cation is estimated be about 0.68 nm, while the size of the $BF_4^-$ anion is estimated to be about 0.48 nm.

Conventional approaches to the design of carbon-based electrodes typically involve maximizing the internal volume of the carbon material, which maximizes the achievable energy density. Specifically, these approaches lead to a predominance of smaller pores which yield a higher surface area per unit volume and thus a higher capacitance. Smaller pores, however, may inhibit the access and adsorption of larger ions. Further, aging-associated deposition of decomposition products from electrolyte may inhibit ion movement or cause ion trapping, which can yield to an undesired attenuation in the capacitance over time and/or cycling of the ultracapacitor.

Applicants have discovered that the pore size as well as the pore size distribution in the carbon-based electrodes can be optimized to account for the disparate ion sizes typically encountered in salt-based electrolytes. Specifically, Applicants have found that the loss of capacitance (e.g., due to ion trapping) can be minimized by tuning the activated carbon pore size and pore size distribution to the size of the ion that interacts with that particular carbon-based electrode.

As described herein, activated carbon can be characterized by a pore volume ratio R, which is defined as a ratio of pore volumes (V1/V), where V1 is the volume of pores in the activated carbon having a size of less than 1 nm, and V is the volume of pores having a size greater than 1 nm. In one embodiment, a ratio R10 is defined as:

$$R10 = \frac{V1}{V10} = \frac{V(d < 1 \text{ nm})}{V(1 < d < 10 \text{ nm})} \quad (1)$$

In equation (1), V10 is the volume of pores having a pore size between 1 and 10 nm. Thus, referring to equation (1), larger values of R (e.g., R10>1) characterize activated carbon materials dominated by ultra-micro pores (d<1 nm), while smaller values of R (e.g., R10<1) characterize activated carbon materials dominated by microscale, mesoscale and potentially larger pores.

In further embodiments, activated carbon can be characterized by ratios R5 or R2, which are respectively defined as the ratio of pore volumes (V1/V5) and (V1/V2), where V5 is the volume of pores having a size between 1 and 5 nm and V2 is the volume of pores having a size between 1 and 2 nm.

In most ionic electrolytes, the cation radius is greater than the anion radius. In one embodiment, the positive carbon-based electrode(s) in an ultracapacitor (attracting the typically smaller negative ion) comprise activated carbon having an R ratio greater than the R ratio of the activated carbon that is incorporated into the negative electrode(s). In this configuration, the carbon-based electrode that interacts with the smaller anion is engineered to comprise a greater proportion of ultramicropores, while the carbon-based electrode that interacts with the cation is engineered to have a larger average pore size. According to a related embodiment, the positive electrode(s) in an ultracapacitor can have an R ratio greater than 1, and the negative electrode(s) can have an R ratio less than 1. In a still further embodiment, the R ratio characterizing the activated carbon that interacts with the smaller electrolyte ion can be greater than the R ratio characterizing the activated carbon that interacts with the larger electrolyte ion.

In embodiments, an ultracapacitor comprises first and second electrodes each comprising respective first and second activated carbon, where an R ratio of the first activated carbon material can range from about 0.5 to 3 (e.g., 0.5, 0.75, 1, 1.5, 2, 2.5 or 3) and the R ratio of the second activated carbon material can independently range from about 0.5 to 3 (e.g., 0.5, 0.75, 1, 1.5, 2, 2.5 or 3). In an example, the R ratio of activated carbon incorporated into a positive electrode can range between 2 and 3, and the R ratio of activated carbon incorporated into a negative electrode can range between 0.75 and 1.

The tuned carbon electrode assembly allows positive and negative ions to easily move in and out of the pores of the respective carbon electrodes, which minimizes capacitance fade while maintaining excellent performance.

In addition to adjusting the pore size distribution, Applicants have found that the initial capacitance of an ultracapacitor comprising tuned carbon-based electrodes can be increased by increasing the thickness of the negative electrode relative to the positive electrode. In embodiments, the negative electrode thickness can be 5, 10, 20, 30, 40, 50, 60, 70, 80, 90 or 100% greater than the positive electrode thickness.

In one embodiment, an electro-chemical double layer capacitor comprises a first electrode (e.g., positive electrode) comprising a first carbon material and a second electrode (e.g., negative electrode) comprising a second carbon material, where a pore volume ratio (e.g., R10, R5 or R2) of the first carbon material is greater than a corresponding pore volume ratio (R10, R5 or R2) of the second carbon material.

When coupled with the asymmetric pore size distribution of the carbon materials incorporated into the respective positive and negative electrodes, providing halogenated carbon in the positive electrode can minimize Faradaic reactions at that electrode during use of the EDLC, particularly at higher applied voltages. The impact of halogenating the carbon material that is incorporated into the positive electrode can be quantified in terms of a Faradaic fraction, which is defined as a normalized difference between the areas associated with cathodic and anodic mechanisms in a plot of current versus voltage for a given cell.

Figure 2:
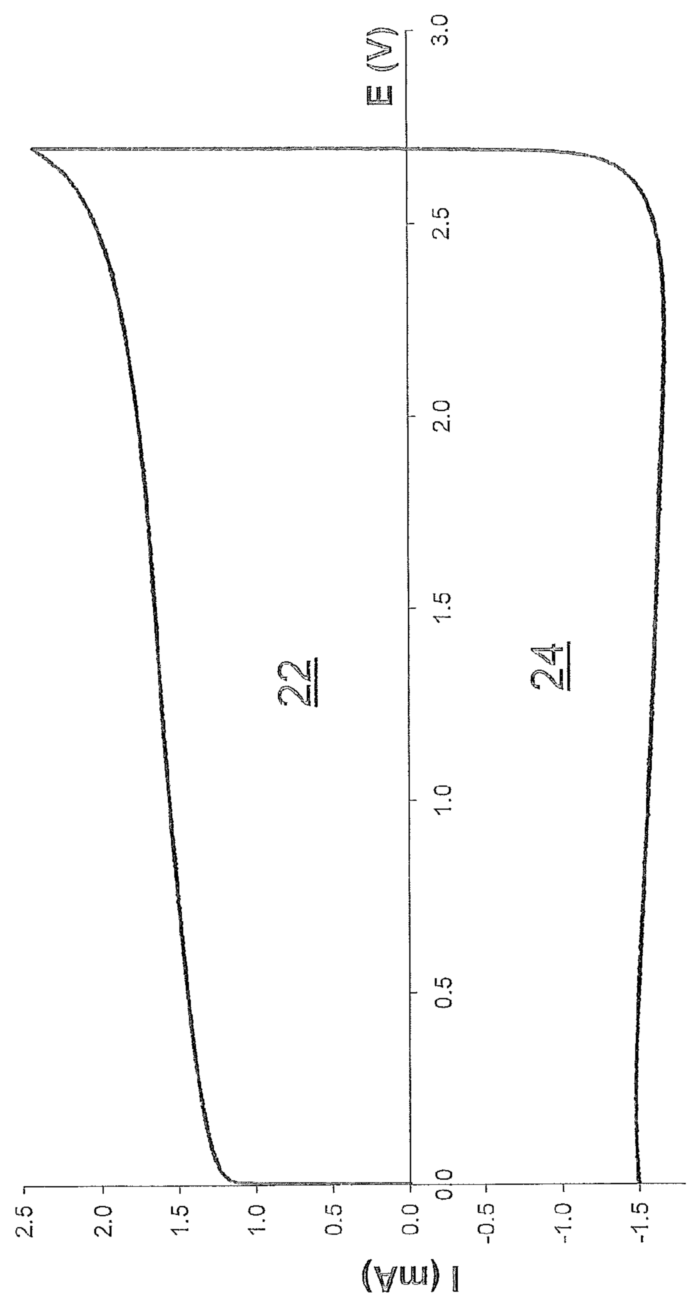
FIG. 2 is an I-V plot showing asymmetric anodic and cathodic areas.

An example I-V curve is shown in FIG. 2, and includes an anodic component at positive currents and a cathodic component at negative currents. The area 22 associated with the anodic component is derived from both Faradaic and non-Faradaic components, and can be expressed as $Q_{anodic}=Q_{Faradaic}+Q_{non\text{-}Faradaic}$, while the area 24 associated with the cathodic component is derived from predominately a non-Faradaic component, and can be expressed as $Q_{cathodic}=Q_{non\text{-}Faradaic}$.

Thus, as a result of Faradaic reactions at the positive electrode (anode), the areas associated with the anodic and cathodic components of the curve will be unequal. A Faradaic fraction can be expressed as the difference between the two areas divided by the area of the non-Faradaic (cathodic) component. As used herein, the Faradaic fraction is defined as $F=(Q_{anodic}-Q_{cathodic})/Q_{cathodic}$. The inventors have determined that in practice, cells exhibiting a Faradaic fraction of less than about 0.1 display acceptable performance.

Halogenation of the carbon can be carried out by flowing a suitable halogen source such as fluorine gas ($F_2$) over the activated carbon. In lieu of, or in addition to, fluorine gas, other halogen sources such as HF, bromine ($Br_2$), iodine ($I_2$), or chlorine ($Cl_2$) gases can be used either separately or in combination. Further, the halogen source can be provided as a gas mixture together with a carrier gas such as nitrogen or argon. A halogenation temperature can range from about 20° C.-300° C. For example, fluorination of activated carbon using fluorine gas can be carried out at a temperature between 20° C. and 250° C., or using HF at a temperature between 25° C. and 100° C. The carbon material can be exposed to the halogen source for a suitable time in order to affect the desired concentration of halogen in the carbon. Without wishing to be bound by theory, the halogen moiety (e.g., F) is believed to replace oxygen atoms in carbon surface groups. Additional methods for halogenating activated carbon are disclosed in U.S. Patent Application Publication No. 2008/0275253, the entire contents of which are incorporated herein by reference.

In embodiments, the carbon of the positive electrode comprises up to about 15 wt. % halogen (e.g., 0.1, 0.2, 0.5, 1, 2, 4, 5, 10, 12 or 15 wt. % fluorine). In contrast, the carbon of the negative electrode is substantially free of halogen such that, in embodiments, the halogen content in the carbon of the negative electrode is less than 1000 ppm (e.g., less than 1000, 500, 100 or 50 ppm). In further embodiments, the halogen content in the carbon of the negative electrode is zero.

EXAMPLES

The invention will be further clarified by the following examples.

Example 1

Wheat flour (3000 g) is placed in a graphite crucible and heated in a retort furnace (CM Furnaces model 1216FL). The furnace temperature is increased at a heating rate of 150° C./hr from room temperature to 800° C., maintained at 800° C. for 2 hrs, and then allowed to cool down naturally to 70° C. or less. During the foregoing heating/cooling cycle, the furnace is purged with $N_2$.

As a result of heating under flowing $N_2$, the wheat flour is carbonized and converted to a carbon material. The carbon can be ground to a powder using a hammer pound, pulverization and vibramilling. The ground carbon powder can have a particle size ($d_{50}$) of 10 micrometers or less (e.g., 1, 2, 5 or 10 micrometers).

The powdered carbon (300 grams) is mixed with 1500 grams of a 45 wt. % aqueous solution of KOH. The resulting mixture is stirred and heated at about 100° C. on a hot plate until the liquid is removed and a solid cake is formed. The cake can be broken into smaller pieces by mechanical force.

The carbon/KOH mixture is placed in SiC crucibles (Hexoloy® SA grade) and heated in a retort furnace. The furnace temperature is increased at a heating rate of 150° C./hr from room temperature to 750° C., maintained at 750° C. for 2 hours, and then allowed to cool down naturally to a temperature of about 100° C. During this heating/cooling cycle, the furnace is purged with $N_2$. By heating the carbon/KOH mixture, the KOH can be incorporated into the carbon material During cooling, once the furnace temperature reaches 100° C., the furnace temperature is maintained at 100° C. for 3 additional hours during which time the furnace is purged with $N_2$ saturated with water vapor. Nitrogen gas saturated with water vapor can be produced by bubbling $N_2$ gas through 95° C. de-ionized water. The furnace is then allowed to cool down naturally to 70° C. or lower.

The resulting activated carbon can then be washed to remove excess potassium, potassium compounds, and other impurities. Washing can comprise rinsing the activated carbon with water or, according to an embodiment, alternately rinsing the activated carbon with water and a mixture of water and acid. One example washing sequence is disclosed below.

In a first washing step, the activated carbon is combined with 3000 mL of de-ionized water and the mixture is stirred and heated on a hot plate at a temperature of from about 90 to 100° C. for 30 minutes. Solid material (i.e., carbon) can be separated from the liquid by vacuum-assisted filtration.

In a second washing step, the previously-obtained carbon material is combined first with 1980 mL of de-ionized water and then 990 mL of 37% aqueous HCl. The mixture is stirred and heated on a hot plate at a temperature of from about 90 to 100° C. for 60 minutes, after which the solid material is separated from the liquid by vacuum-assisted filtration.

In order to decrease the oxygen content in the activated carbon, the activated carbon can be treated with an additional heat treatment, which includes heating the activated carbon in an inert or reducing atmosphere. For example, the oxygen content in the carbon material that is incorporated into a carbon-based electrode can be less than 5 wt. % (e.g., less than 5, 4, 3, 2 or 1 wt. %). In an embodiment, the oxygen content in the negative electrode is minimized while providing for a specified halogen content in the positive electrode.

In an embodiment, the activated carbon is placed in SiC crucibles and loaded into a furnace (CM Furnaces model 1216FL or 1212FL). The furnace temperature is increased at a heating rate of 150° C./hr to a temperature of about 800° C., maintained at temperature for 2 hours, and then allowed to cool down naturally. During the foregoing heating/cooling cycle, the furnace is constantly purged, e.g., with $N_2$ or a $H_2/N_2$ mixture.

Figure 3:
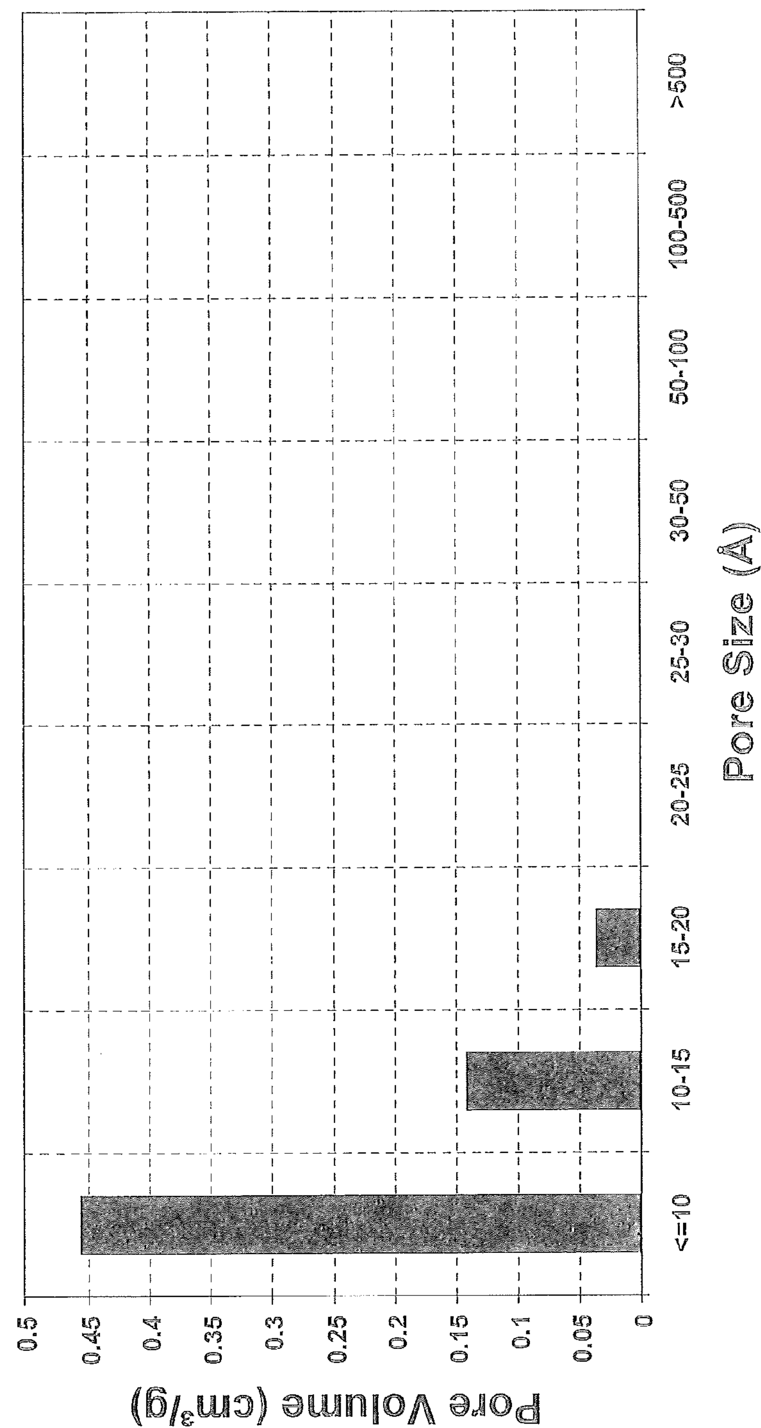
FIG. 3 is a plot of pore volume versus pore size for an example KOH-activated carbon.

Pore size data is determined using $N_2$ adsorption on a Micromeritics ASAP 2420 and calculated using the Density Functional Theory (DFT) assuming slit pores. The pore size distribution of the chemically-activated carbon is shown in FIG. 3.

Electrical properties of the carbon can be obtained by incorporating the activated carbon into carbon-based electrodes, which are in turn incorporated into an ultracapacitor. To form the carbon-based electrodes, the activated carbon is first combined with conductive carbon (e.g., Black Pearls®, which is marketed by Cabot Corporation, Boston, Mass. Black Pearl 2000) and Teflon® (PTFE). The carbon black serves as a conductive additive and the PTFE serves as a binder. The activated carbon, carbon black and PTFE are blended in the proportion of 85:5:10 by weight and rolled into thin sheets, which are laminated onto aluminum current collectors. The carbon-based electrodes are rolled into jelly roll using a cellulosic separator, and then placed into an aluminum can to form an ultracapacitor for testing. A solution of 1.5 M tetraethylammonium tetrafluoroborate (TEA-TFB) in acetonitrile is used as the electrolyte.

A comparative ultracapacitor was constructed using identical positive and negative carbon-based electrodes, i.e., the same microporous carbon material was used to form each electrode. The activated carbon made using the foregoing method had an R5 value $(V(d<1\ nm)/V(1<d<5\ nm))$ of about 2.6 and an R2 value $(V(d<1\ nm)/V(1<d<2\ nm))$ of about 2.6. The thickness of the electrodes was about 100 microns. The initial capacitance of the ultracapacitor was about 495 Farads.

Example 2

Figure 4:
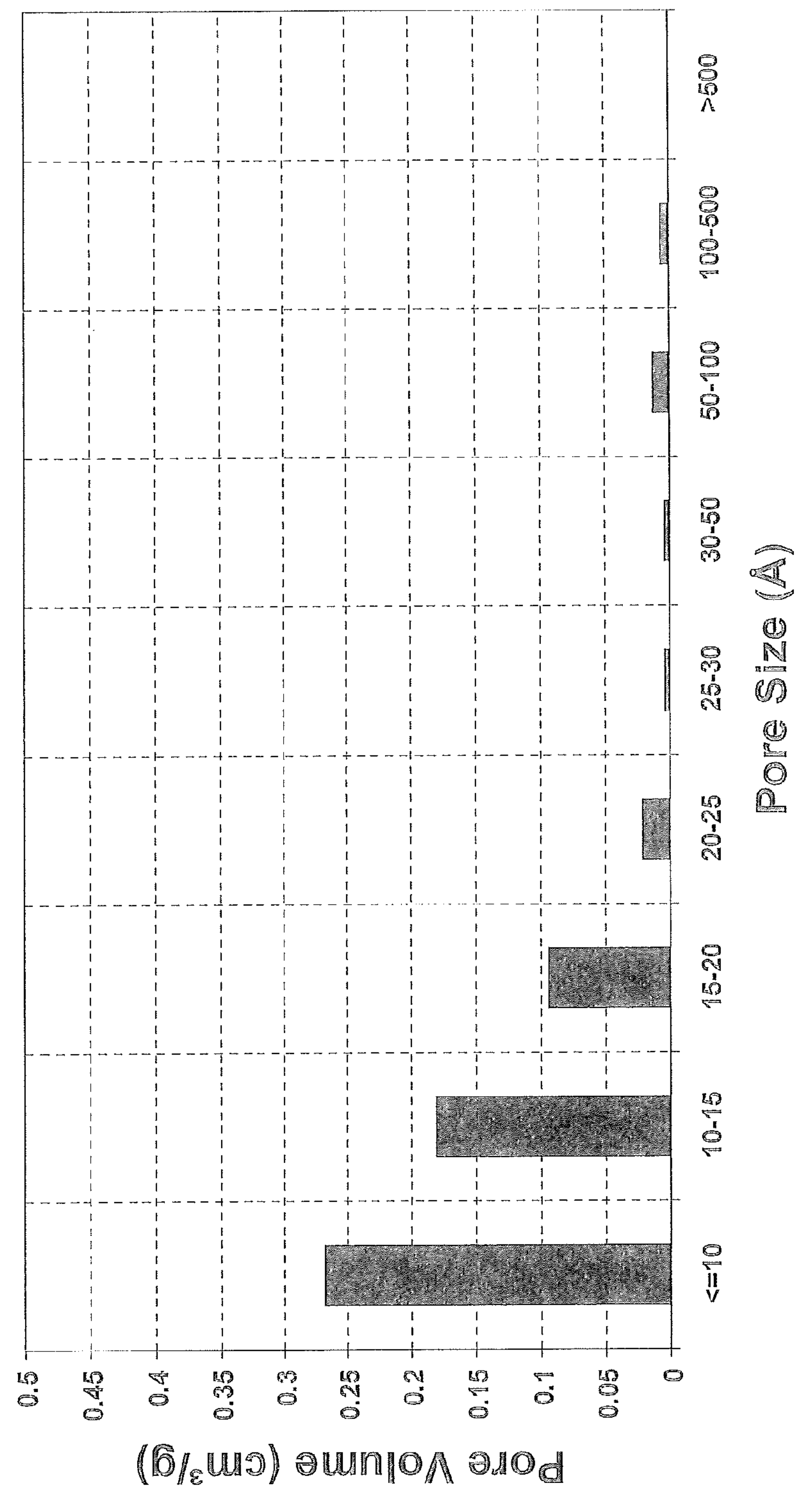
FIG. 4 is a plot of pore volume versus pore size for an example steam-activated carbon.

A commercially-available steam-activated carbon was used to prepare a second comparative ultracapacitor. The carbon-based electrodes were prepared in the manner described in Example 1. Referring to FIG. 4, which shows the corresponding pore size distribution, the microporous steam-activated carbon had an R5 value of about 0.88 and an R2 value of about 0.97, which is consistent with a lower pore volume attributable to ultramicropores. The resulting ultracapacitor had an initial capacitance of about 350 Farads.

Example 3

An inventive ultracapacitor was fabricated using both the chemically-activated carbon of Example 1 and the steam-activated carbon of Example 2. The positive electrode of the ultracapacitor (which interacts with the smaller $BF4^-$ anions) was made using the chemically-activated carbon of example 1 (R5~2.6) and the negative electrode was made using the steam activated carbon (R5~0.88). The thickness of each electrode was about 100 microns. The initial capacitance of the ultracapacitor was about 440 Farads.

Figure 5:
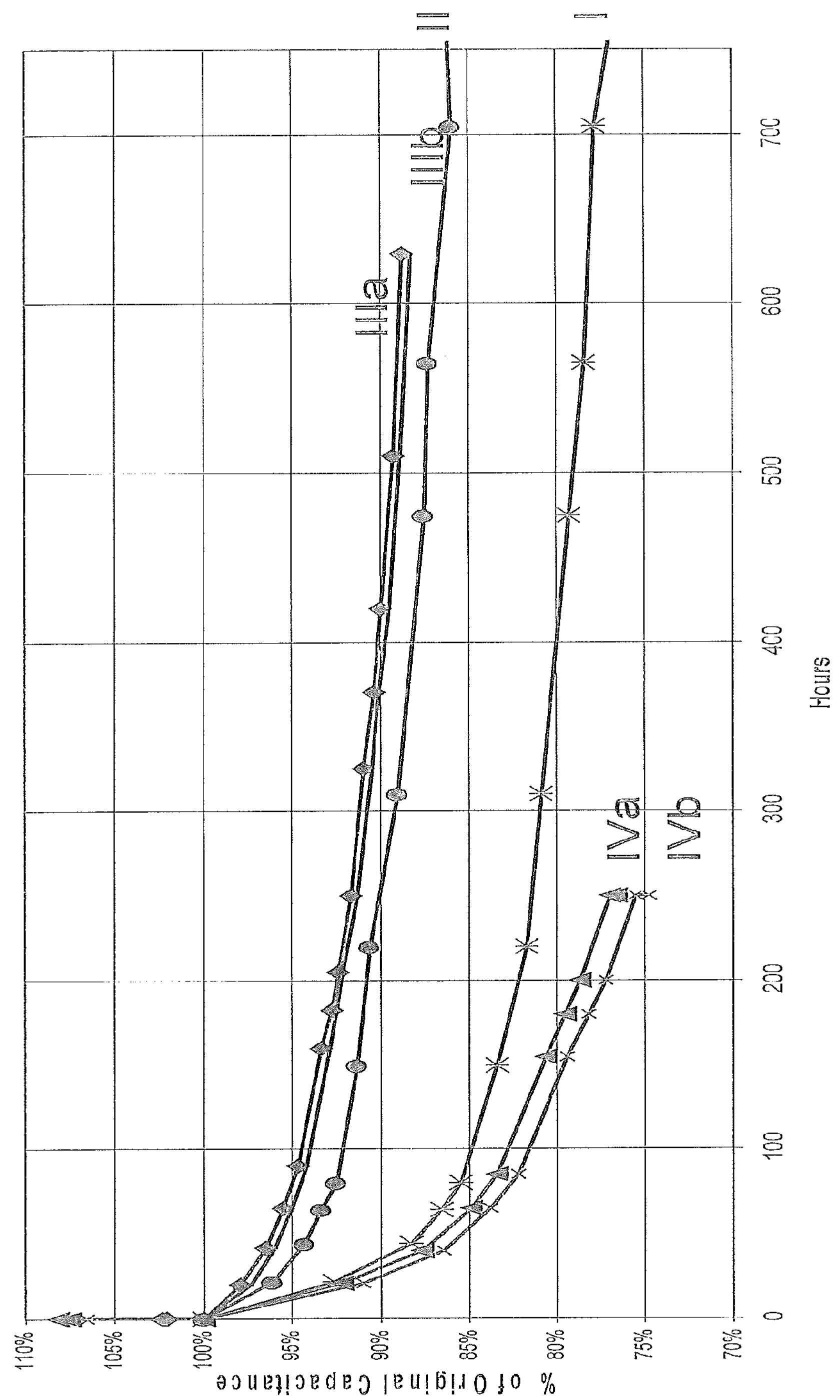
FIG. 5 is a graph illustrating capacitive aging in comparative and inventive electro-chemical double layer capacitor cells.

The ultracapacitor cells from Examples 1-3 were subjected to accelerated aging at 2.5V and 65° C., and their performance was measured periodically. FIG. 5 is a plot showing the percent decline in the measured capacitance over time. In FIG. 5, curves I, II and III correspond to the aging test results corresponding to Example 1-3 respectively, with curves IIIa and IIIb representing repeated testing of the inventive Example 3 cell.

As seen in FIG. 5, the percent decline in capacitance for the tailored electrodes of Example 3 was only about 7% at 200 hours, compared to 17% and 9% declines respectively for Examples 1 and 2.

Example 4

The experiment of Example 3 was repeated except the thickness of the negative carbon-based electrode was engineered to have a thickness 5% greater than the thickness of the positive electrode. The thickness of the negative electrode was about 105 microns, while the thickness of the positive electrode was about 100 microns. Although the overall aging behavior of the ultracapacitor incorporating the thicker negative electrode was similar to the aging behavior observed for Example 3, the initial cell capacitance was about 455 Farads.

Example 5

In order to clearly demonstrate the beneficial results associated with the tailored electrodes of Examples 4 and 5, Example 3 was again repeated except the activated carbon materials in the respective positive and negative electrodes were exchanged. In the present example, the chemically-activated carbon (having the greater R ratio) was incorporated into the negative electrode, while the steam-activated carbon was incorporated into the positive electrode. As seen in FIG. 5, where curves IVa and IVb represent data from repeat testing of this inverted configuration, the decrease in capacitance was dramatic. After 200 hours, the capacitance drop was about 23%, which clearly underscores the benefit of appropriately associating pore size distribution with ion size.

Example 6

Figure 6:
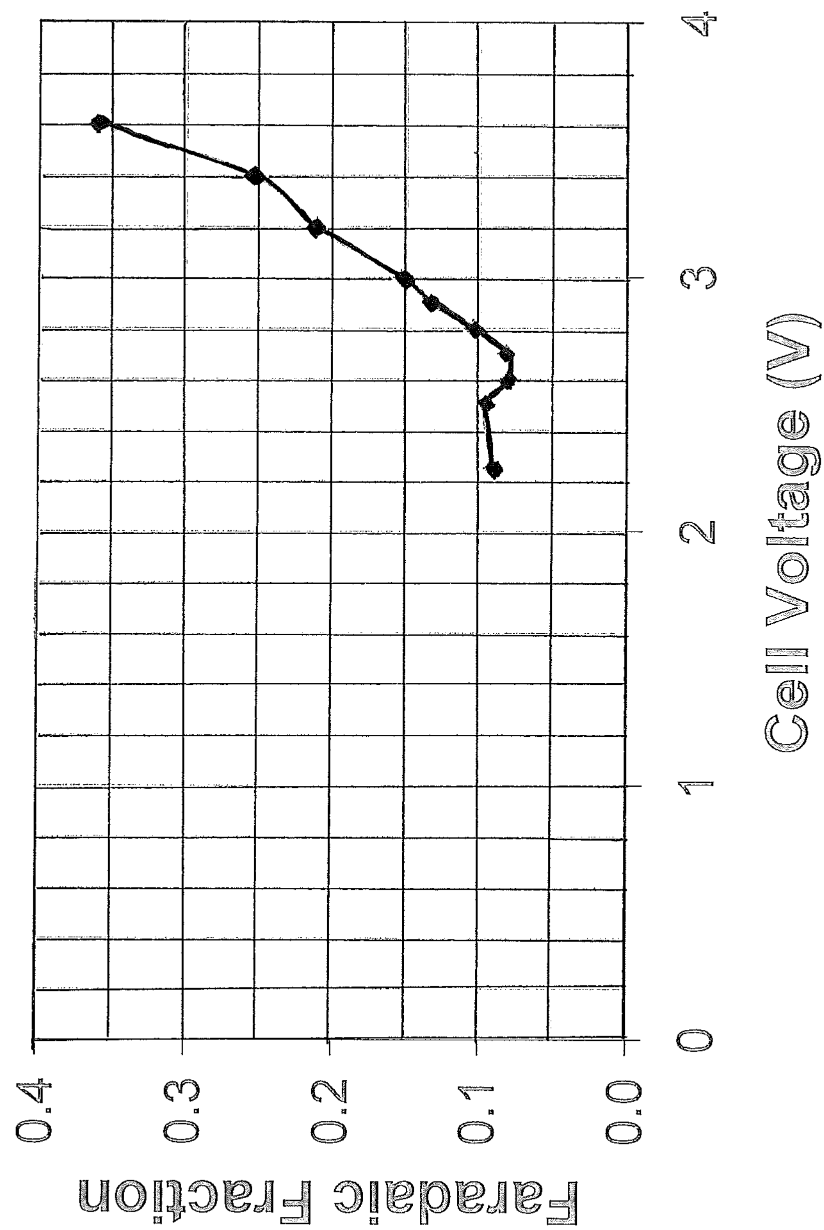
FIG. 6 is a plot of Faradaic fraction versus applied voltage for a symmetric EDLC.

A family of I-V curves similar to the curve shown in FIG. 2 were generated at various applied voltages using the symmetric ultracapacitor of Example 1. The halogen content of both electrodes was less than 100 ppm. The locus of Faradaic fraction values were plotted versus the applied voltage, and the corresponding data are shown in FIG. 6. As can be seen, the Faradaic fraction is initially about 0.1 but increases with applied voltage and exceeds 0.1 at about 2.7 Volts.

Example 7

Figure 7:
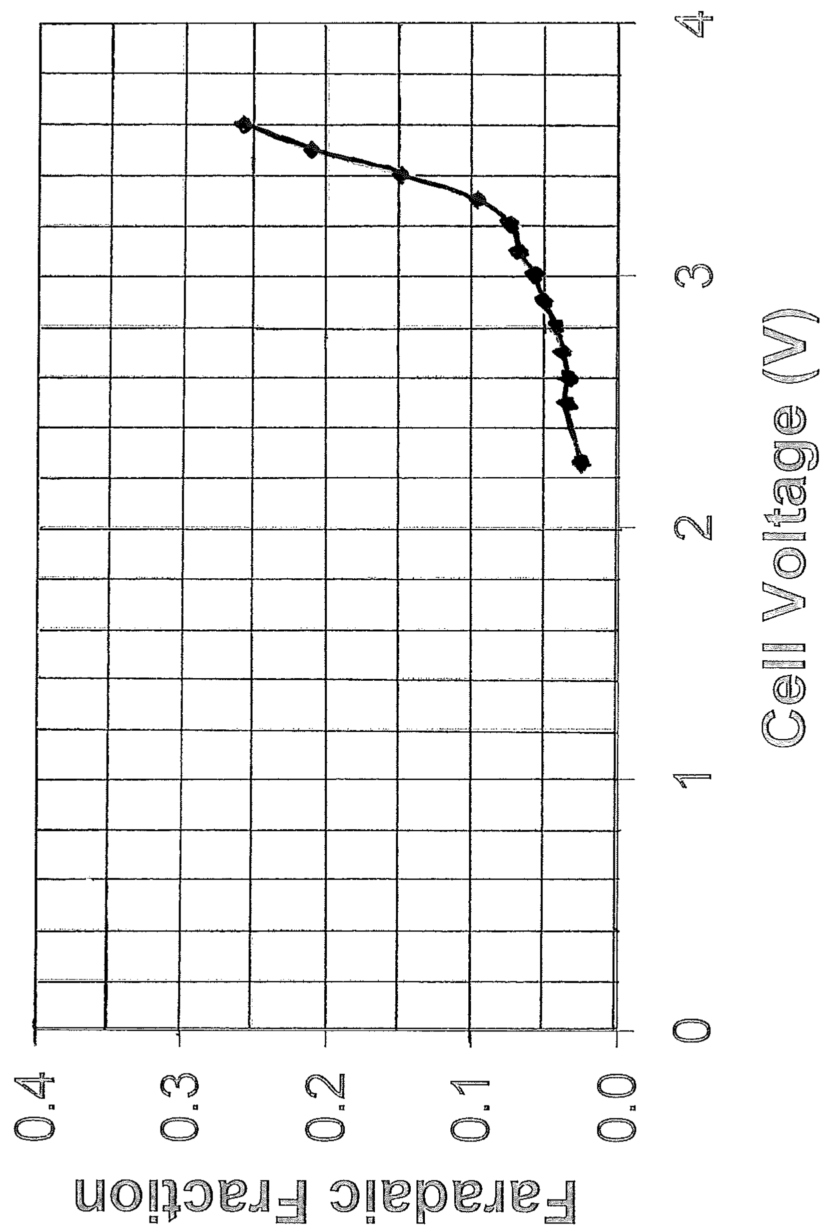
FIG. 7 is a plot of Faradaic fraction versus applied voltage for an asymmetric EDLC comprising halogenated activated carbon in the positive electrode.

A second family of I-V curves were generated at various applied voltages using the asymmetric ultracapacitor of Example 3. Prior to forming the ultracapacitor of the current example, the carbon used to form the positive electrode was fluorinated using fluorine gas to a fluorine content of about 4.5 wt. %. The halogen content of the negative electrode was less than 100 ppm. The locus of Faradaic fraction values were plotted versus applied voltage, and the corresponding data are shown in FIG. 7. The Faradaic fraction is initially less than 0.1, and although the Faradaic fraction increases with applied voltage, it remains less than 0.1 until an applied voltage of about 3.3 Volts. The foregoing demonstrates that by using halogenated carbon-based electrodes, voltage-induced Faradaic reactions can be suppressed in the positive electrode and the range of applied operating voltages can be increased to values in excess of 3V.

This disclosure provides electro-chemical double layer capacitors having positive and negative electrodes that comprise first and second carbon-based electrodes where the pore size and pore size distribution within the respective electrodes are tailored to the size of the ion that interacts with that electrode. The carbon incorporated into the positive electrode is halogenated, while the carbon incorporated into the negative electrode is not halogenated. Such customization provides high specific capacitance as well as improved capacitive aging and long term stability at high voltages. Methods for making such activated carbon materials are also disclosed.

As used herein, the singular forms "a," "an" and "the" include plural referents unless the context clearly dictates otherwise. Thus, for example, reference to a "solvent" includes examples having two or more such "solvents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An electro-chemical double layer capacitor comprising:

a positive electrode comprising a halogenated first activated carbon material and a negative electrode comprising an un-halogenated second activated carbon material, wherein the negative electrode is substantially halogen free.

2. An electro-chemical double layer capacitor according to claim 1, wherein the halogenated first activated carbon material comprises fluorinated carbon.

3. An electro-chemical double layer capacitor according to claim 1, wherein the halogenated first activated carbon material comprises up to about 15 wt. % halogen.

4. An electro-chemical double layer capacitor according to claim 1, wherein the un-halogenated second activated carbon material comprises less than 5 wt. % oxygen.

5. An electro-chemical double layer capacitor according to claim 1, wherein a thickness of the negative electrode is greater than a thickness of the positive electrode.

6. An electro-chemical double layer capacitor according to claim 1, wherein a thickness of the negative electrode is from 1 to 2 times a thickness of the positive electrode.

7. An electro-chemical double layer capacitor according to claim 1, wherein a pore volume ratio of the first activated carbon material is greater than a pore volume ratio of the second activated carbon material, the pore volume ratio R being defined as R=V1/V, where V1 is a total volume of pores having a pore size of less than 1 nm, and V is a total volume of pores having a pore size greater than 1 nm.

8. An electro-chemical double layer capacitor according to claim 7, wherein V is a total volume of pores having a pore size between 1 nm and 10 nm.

9. An electro-chemical double layer capacitor according to claim 7, wherein V is a total volume of pores having a pore size between 1 nm and 5 nm.

10. An electro-chemical double layer capacitor according to claim 7, wherein V is a total volume of pores having a pore size between 1 nm and 2 nm.

11. An electro-chemical double layer capacitor according to claim 7, wherein the pore volume ratio of the first activated carbon material is between 2 and 3 and the pore volume ratio of the second activated carbon material is between 0.75 and 1.

12. An electro-chemical double layer capacitor according to claim 7, wherein the pore volume ratio of the first activated carbon material is greater than 1 and the pore volume ratio of the second activated carbon material is less than 1.

13. An electro-chemical double layer capacitor according to claim 1, wherein the positive electrode comprises a mixture of the first activated carbon material, conductive carbon and binder, and the negative electrode comprises a mixture of the second activated carbon material, conductive carbon and binder.

14. An electro-chemical double layer capacitor according to claim 1, wherein the electro-chemical double layer capacitor further comprises an electrolyte solution comprising a salt dissolved in a solvent, where the salt is selected from the group consisting of quaternary ammonium salts.

15. An electro-chemical double layer capacitor according to claim 1, wherein the electro-chemical double layer capacitor further comprises an electrolyte solution comprising tetraethyl ammonium tetrafluoroborate and acetonitrile.

16. An electro-chemical double layer capacitor according to claim 1, wherein the halogenated first carbon material comprises 0.1 to 15 wt. % fluorine.

17. A method of making an electro-chemical double layer capacitor comprising:

forming a first carbon-based electrode having a first halogenated carbon material;

forming a second carbon-based electrode having a second un-halogenated carbon material, wherein the second carbon-based electrode is substantially halogen free; and incorporating the first and second carbon-based electrodes into an electro-chemical double layer capacitor.

18. The method according to claim 17, wherein a pore volume ratio of the first carbon material is greater than a pore volume ratio of the second carbon material, the pore volume ratio R being defined as $R=V1/V$, where V1 is a total volume of pores having a pore size of less than 1 nm, and V is a total volume of pores having a pore size greater than 1 nm.

19. The method according to claim 17, wherein the first carbon-based electrode is a positive electrode and the second carbon-based electrode is a negative electrode.

* * * * *